United States Patent [19]

Machek

[11] Patent Number: 5,044,471

[45] Date of Patent: Sep. 3, 1991

[54] GREASE GUN CARTRIDGE ADAPTER

[75] Inventor: John A. Machek, St. Louis, Mo.

[73] Assignee: Lincoln, St. Louis, Mo.

[21] Appl. No.: 512,319

[22] Filed: Apr. 23, 1990

[51] Int. Cl.⁵ .............................................. F16N 21/00
[52] U.S. Cl. .............................. 184/105.2; 184/105.3;
222/256; 222/383
[58] Field of Search ............... 184/105.1, 105.2, 105.3,
184/27.1; 222/256, 383, 327; 285/177

[56] References Cited

U.S. PATENT DOCUMENTS

| | | |
|---|---|---|
| 260,597 | 9/1982 | Mathuda . |
| 1,608,748 | 11/1926 | Hundemer ........................... 222/256 |
| 1,961,553 | 6/1934 | Dodge et al. ........................ 222/256 |
| 3,061,202 | 10/1962 | Tyler .................................... 222/383 |
| 3,190,619 | 6/1965 | Penney et al. . |
| 3,341,085 | 9/1967 | Sundholm . |
| 3,405,843 | 10/1968 | Watson, Jr. ......................... 222/383 |
| 3,421,662 | 1/1969 | Hanson . |
| 3,439,839 | 4/1969 | Schumann et al. . |
| 3,575,318 | 4/1969 | Kunz . |
| 3,951,310 | 4/1976 | Steiman . |
| 4,136,802 | 1/1979 | Mascia et al. . |
| 4,225,061 | 9/1980 | Blake et al. ......................... 222/383 |
| 4,300,705 | 11/1981 | Shy ....................................... 222/383 |
| 4,421,166 | 12/1983 | Cain . |
| 4,480,768 | 11/1984 | Martin ................................. 222/383 |
| 4,610,369 | 9/1986 | Mercier . |
| 4,822,077 | 4/1989 | Hendrickson ....................... 285/177 |

FOREIGN PATENT DOCUMENTS

| | | | |
|---|---|---|---|
| 0056936 | 10/1952 | France ................................ 222/383 |
| 0325999 | 4/1935 | Italy .................................... 222/256 |

Primary Examiner—James C. Yeung
Assistant Examiner—Alan B. Cariaso
Attorney, Agent, or Firm—Rogers, Howell & Haferkamp

[57] ABSTRACT

An insert adapter is provided for use with a grease gun having a dispensing barrel, a pump housing, and a grease supply casing of the type that is either packed with grease in bulk or receives an open ended grease cartridge. The insert adapter adapts the grease gun to receive a bellows type grease cartridge having a threaded dispensing outlet at one end. The adapter comprises a circular cone shaped body with a threaded connector socket at its center. The periphery of the cone shaped body fits securely in the interior of the grease gun pump housing, and the threaded connector socket securely receives the threaded outlet of the bellows grease cartridge, thereby adapting the grease gun to receive and be supplied by a bellows type grease cartridge.

20 Claims, 1 Drawing Sheet

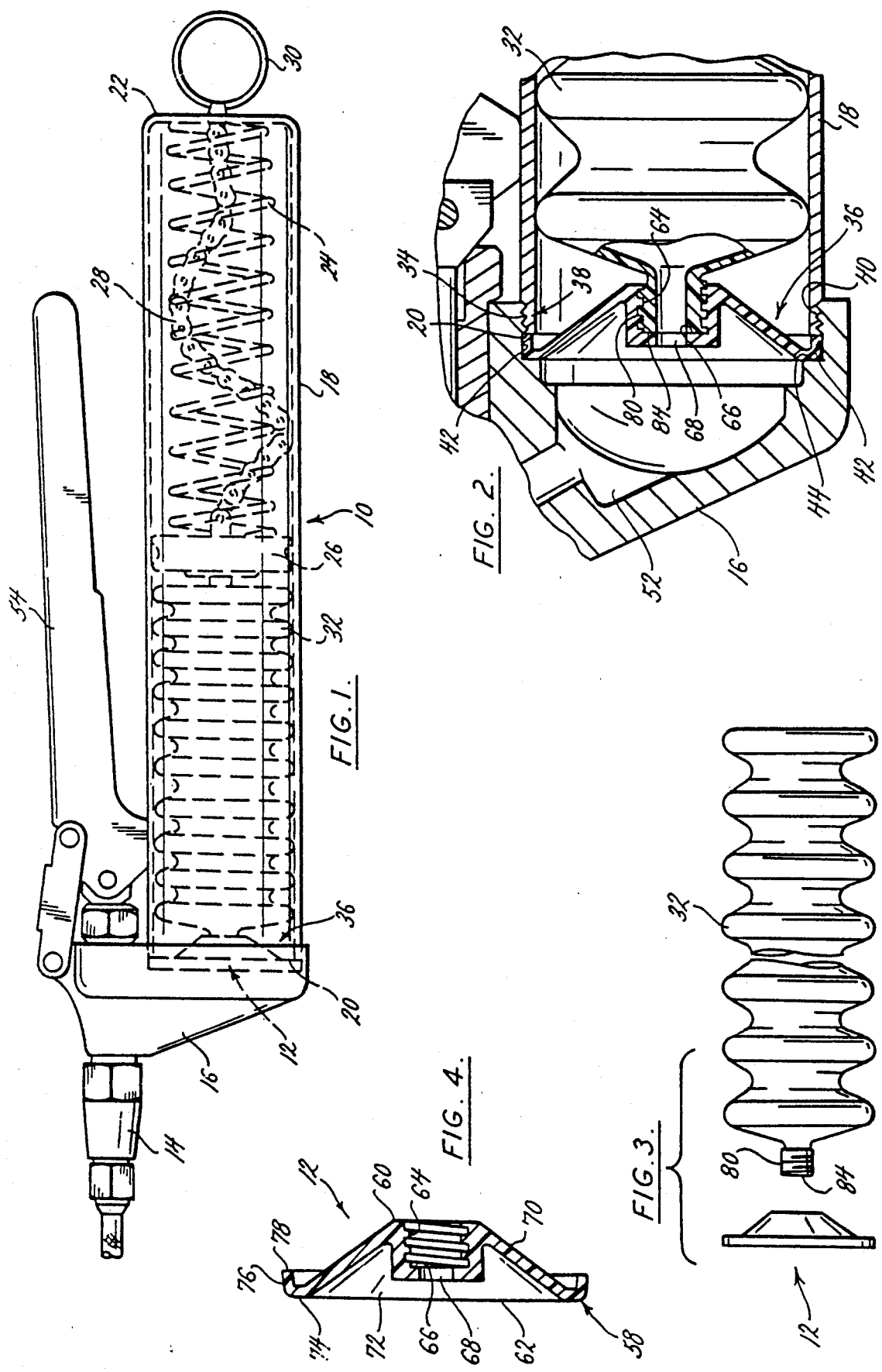

GREASE GUN CARTRIDGE ADAPTER

BACKGROUND OF THE INVENTION (1) Field of the Invention

The present invention relates to an insert that adapts a hand operated grease gun to receive a bellows type grease cartridge. In particular, the present invention provides a semi-rigid plastic adapter that is press fit into the pump housing of a manual grease gun and is connectible to a threaded outlet of a bellows type grease cartridge.

(2) Description of the Related Art

Manually operated high pressure grease guns of the type with which the present invention is used commonly comprise a dispensing barrel, a pump housing, and a grease supply tube casing. The dispensing barrel commonly has a nozzle fitting at its distal end for dispensing grease pumped from the gun. The proximal end of the barrel communicates with a manually operated pump contained in the pump housing. The pump is operated by a manual lever mechanism pivotally connected to the pump housing. Manipulating the lever mechanism dispenses grease contained in the supply tube casing of the gun, through the dispensing barrel. The tube casing is removably attached to a threaded grease supply opening of the pump housing by a series of screw threads provided at an open end of the casing. A spring biased piston housed in the tube casing supplies grease to the pump, and automatically decreases the volume of the tube casing as grease is dispensed from the gun.

Prior to using the grease gun, the operator of the gun first unscrews the tube casing from the grease supply opening of the gun pump housing, and retracts the piston in the casing. The operator then either packs grease in bulk in the open end of the tube casing, or inserts an open ended cylindrical grease cartridge into the tube casing. The operator then reassembles the casing to the pump housing by screwing the casing open end into the grease supply opening of the pump housing. The grease gun in now ready for use.

Grease guns of this type often have only a cast conduit in the interior of the pump housing supply opening that receives grease displaced from the casing by the spring biased piston. The conduit conducts the grease to the manually operated pump contained in the pump housing, which dispenses the grease from the gun under increased pressure.

Another type of manually operated grease gun includes a pump housing constructed with a conduit having a threaded socket in the housing grease supply opening. The threaded socket communicates the tube casing interior with the manual pump in the pump housing. This type of grease gun is specifically designed to be used with a bellows type grease cartridge that has a threaded dispensing outlet at one end. The operator unscrews the supply tube casing from the pump housing to expose the grease supply opening, and the threaded outlet of the bellows cartridge is screwed into the threaded socket provided in the supply opening of the gun pump housing. The spring biased piston is then retracted into the casing by pulling on a chain that extends from the closed end of the casing, and the casing is reassembled to the pump housing. This system is much easier to resupply with grease than prior art systems, for the operator need only unscrew an emptied grease cartridge from the threaded socket of the pump housing, and screw a new grease cartridge into the threaded socket before reassembling the casing to the housing. This prior art system is also cleaner to operate than other prior art systems in that the grease dispensed from the bellows cartridge is contained within the pump housing of the gun, and unlike previously used systems, the interior of the casing is not exposed to the grease.

One disadvantage found in the use of the bellows type grease cartridge is that it may only be used with the specific type of grease gun having the threaded socket that is connected to the threaded dispensing outlet of the cartridge. Prior art grease guns not specifically designed with a threaded socket for connection to the threaded dispensing outlet of the bellows grease cartridge cannot be used with this cartridge.

The present invention overcomes the disadvantages associated with the bellows type grease cartridge by providing an insert for grease guns that are not specifically designed for use with the bellows type grease cartridge, that adapts the grease gun for use with such a cartridge.

It is therefore an object of the present invention to provide an adapter that is inserted into the pump housing of a grease gun, that provides a sealing partition between the interior of the pump housing and the interior of the grease supply tube casing, that provides a threaded connection that is dimensioned to receive the threaded dispensing outlet of a bellows type grease cartridge, and that adapts the grease supply opening of the grease gun pump housing for connection to a threaded outlet of a bellows type grease cartridge.

SUMMARY OF THE INVENTION

The grease gun cartridge adapter of the present invention is designed to adapt a grease gun having a dispensing barrel, a pump housing, and a grease supply tube casing of the type that is either packed with grease in bulk or receives an open ended grease cartridge, to receive a bellows type grease cartridge having a threaded dispensing outlet at one end.

The insert adapter is formed as a circular cone with a connector assembly at the apex of the cone and an annular sealing rim assembly at the base of the cone.

The connector assembly at the cone apex is generally a cylindrical socket with interior threads. The socket extends from the apex toward the cone base, into the volume of the cone. An annular sealing shoulder is provided at the bottom of the threaded socket, and is positioned between the cone apex and base. A conduit passes through the center of the sealing shoulder, and together with the threaded interior of the socket, communicates one side of the insert adapter with the other side of the insert adapter.

The rim formed at the base of the cone completely surrounds the cone periphery and includes bottom and top annular sealing surfaces connected by a peripheral friction surface. The rim friction surface is tapered slightly outward between the bottom sealing surface at the base of the cone, and the top sealing surface spaced slightly above the base of the cone.

The entire insert is constructed of a semi-rigid urethane that gives the insert sufficient rigidity to seal the grease gun pump housing interior from the tube casing interior, yet provides sufficient flexibility to permit the adapter to be easily inserted into the interior of the gun pump housing supply opening.

In use, the grease gun user first removes the grease supply tube casing from the gun, exposing the grease supply opening in the pump housing of the gun. The grease supply opening of most grease guns is defined by a cylindrical sidewall extending into the opening, and a smooth annular surface at the bottom of the opening. A cast conduit communicating with the manual pump contained in the pump housing opens into the supply opening of the pump housing inside the annular surface at the bottom of the opening. The cylindrical sidewall of the supply opening is partially covered by the screw threads that mesh with the screw threads on the exterior surface of the tube casing when the casing is assembled to the pump housing. A portion of the cylindrical sidewall adjacent the annular surface at the bottom of the opening is not covered with screw threads. This portion of the sidewall presents a smooth surface that engages the peripheral surface of a circular gasket seal inserted into the supply opening of the pump housing between the annular surface at the bottom of the opening and the threads on the cylindrical sidewall. The gasket seal has a rectangular cross section and the bottom annular surface of the opening also engages a side of the gasket seal inserted in the pump housing supply opening.

The insert adapter of the present invention is dimensioned to be inserted, base first, into the cylindrical supply opening of the pump housing. The adapter occupies the position in the housing commonly occupied by the gasket seal, with the bottom annular sealing surface of the adapter engaging the annular sealing surface at the bottom of the pump housing supply opening. To insert the adapter, the tapered rim surrounding the periphery of the adapter is first pressed into the threaded portion of the supply opening cylindrical sidewall. The tapered configuration of the adapter rim permits the rim to compress slightly, allowing the adapter to be pressed past the threaded portion of the cylindrical sidewall, to the smooth portion of the cylindrical sidewall adjacent the annular surface at the bottom of the opening. When the adapter is pressed past the interior threads, the compressed tapered rim then expands outward and seats securely against the smooth portion of the cylindrical sidewall at the bottom of the housing supply opening. In this position, the frictional engagement between the tapered rim and the sidewall prevents the adapter insert from rotating relative to the pump housing, and the annular bottom surface of the adapter rim sealingly engage the annular bottom surface of the housing supply opening. With the adapter in its inserted position in the pump housing, the operator next attaches a bellows type grease cartridge to the housing by screwing the threaded outlet end of the cartridge into the threaded socket at the apex of the adapter. The operator then assembles the tube casing to the pump housing by retracting the spring biased piston into the casing, and screwing the threads on the exterior surface of the casing into the threads provided on the cylindrical sidewall of the pump housing supply opening. The casing is screwed into the housing grease supply opening, until the open end of the casing abuts against the top annular sealing surface of the adapter rim. The top annular sealing surface of the adapter sealingly engages around the open end of the casing, and together with the bottom annular sealing surface of the adapter, separates the casing interior containing the grease cartridge from the pump housing interior.

To replace an emptied bellows cartridge, the operator need only disassemble the tube casing from the pump housing and unscrew the emptied cartridge from the threaded socket of the insert adapter before screwing a new bellows cartridge into the threaded socket.

BRIEF DESCRIPTION OF THE DRAWINGS

Further objects and features of the present invention are revealed in the following detailed description of the preferred embodiment of the invention and in the drawing figures wherein:

FIG. 1 is a side elevation view in section of the insert adapter of the present invention in place in a manually operated high pressure grease gun;

FIG. 2 is a segmented elevation view in section showing in detail the insert adapter of the present invention in its operative position in a manually operated grease gun and connected with a bellows type grease cartridge;

FIG. 3 is a plan view of the insert adapter of the present invention and a bellows type grease cartridge having a threaded dispenser outlet at one end; and FIG. 4 is a elevation view in section of the insert adapter of the present invention.

DESCRIPTION OF THE PREFERRED EMBODIMENT

FIG. 1 shows a manually operated high pressure grease gun 10 of the type that make up the operative environment of the insert adapter 12 of the present invention. The grease gun 10 is generally comprised of a dispenser barrel 14, a pump housing assembly 16, and a grease supply tube casing 18.

The tube casing 18 is substantially cylindrical, with an open first end 20 that is screw threaded into a grease supply opening of the pump housing 16, and a closed second end 22 that has a small center opening (not shown). A spring 24 biases a piston plunger 26 in the casing toward the first end 20 of the casing. A chain 28 is connected to the plunger and extends through the small opening in the second end 22 of the casing to a pull ring 30. The chain 28 enables the operator to retract the plunger 26 in the casing to permit the insertion of a bellows type grease cartridge 32 into the casing volume in front of the plunger. External threads 34 at the first end 20 of the casing couple the casing to the pump housing 16 of the grease gun.

The pump housing 16 of the gun contains the manually operated high pressure pump (not shown) that supplies grease under increased pressure to the dispensing barrel 14. The pump housing 16 is provided with a cylindrical grease supply opening 36, into which the tube casing 18 is screw threaded. The supply opening is defined by a cylindrical sidewall 38, a portion of which is covered with internal screw threads 40, and the remainder of which is a smooth cylindrical interior wall 42. The screw threads 40 project into the grease supply opening 36 beyond the surface of the smooth portion 42 of the cylindrical wall. An annular sealing surface 44 is provided at the bottom of the pump housing supply opening. The interior of the pump housing grease supply opening 36 communicates with the high pressure pump assembly (not shown) contained in the pump housing through a series of grease supply conduits 50, 52.

In operation of a prior art grease gun that does not employ the insert adapter of the present invention, the operator first unscrews the grease supply tube casing 18 from the pump housing grease supply opening 36 to pack the casing interior with grease. After removing the casing, the plunger 26 is then retracted toward the second end 22 of the casing 18 by the operator pulling the pull ring 30 and the chain 28 from the casing. The casing is then packed through its open first end 20 with grease in bulk or with an open ended grease cartridge. The operator then reassembles the casing into the grease supply opening of the pump housing 16. The force exerted on the grease by the spring biased plunger causes the grease packed into the casing to pass through the series of conduits 50, 52 to the manually operated high pressure pump (not shown) contained in the pump housing 16. The operator manipulates the pump handle 54, causing the grease supplied through the conduits 50, 52 to the high pressure pump to be dispensed at increased pressure through the dispensing barrel 14 of the gun.

The insert adapter of the present invention adapts the above described grease gun for use with a bellows type grease cartridge of the type shown in FIG. 3 of the drawings. The insert adapter 12 is constructed in the form of a circular cone with a connector assembly 56 formed at the apex 60 of the cone and an annular sealing rim assembly 58 formed at the base 62 of the cone.

The connector assembly 56 at the cone apex is generally a cylindrical socket with screw threads 64 spiraling over its interior surface. The socket extends from the apex 60 toward the base 62 of the cone, into the cone volume. An annular sealing shoulder 66 is provided at the bottom end of the socket spaced between the cone apex and base. A conduit 68 passes through the center of the sealing shoulder 66, and together with the socket interior, communicates a first side 70 of the insert adapter 12 with a second side 72 of the adapter. The interior screw threads 64 of the connector assembly 56 are dimensioned to mesh with the threads of the bellows cartridge dispenser outlet.

The annular sealing rim formed at the base of the adapter includes a first annular sealing surface 74 on the bottom of the cone completely surrounding the periphery of the cone. The rim also includes a peripheral friction surface 76 that tapers outward from the first annular sealing surface 74 to a second annular sealing surface 78 provided at the opposite end of the rim above the first annular surface 74. The first and second annular sealing surfaces 74, 78 are connected by the tapered peripheral surface 76 of the insert adapter rim.

With the tube casing 18 removed from the pump housing 16, the insert adapter 12 is inserted, base 62 first, into the grease supply opening 36 of the pump housing 16. The taper of the adapter rim assembly 58 is compressed slightly inward as the adapter is pressed past the internal threads 40 of the pump housing supply opening 36. Once the rim assembly is inserted completely past the internal threads 40 of the housing and into the area of the smooth interior wall portion 42, the resiliency of the tapered rim then causes the rim to expand outward and engage the smooth sidewall portion 42. This produces a secure friction engagement between the peripheral friction surface 76 of the rim assembly 58 and the smooth cylindrical sidewall portion 42 of the pump housing supply opening 36. In this position, the first annular sealing surface 74 of the insert adapter engages the annular sealing surface 44 at the bottom of the grease supply opening of the housing and seals the interior conduits 50, 52 of the pump housing from fluid communication with the area outside the adapter 12 except through the conduit 68, and the threaded interior 64 of the adapter socket connecter 56. The operator next screws the threaded outlet 80 of the bellows cartridge into the socket threads 64 of the connector assembly 56. When the outlet 80 of the bellows cartridge is completely screwed into the threaded socket 64 of the connector assembly 56, an annular end surface 84 of the cartridge outlet 80 will engage with the annular shoulder 66 around the conduit opening 68 and form a fluid tight seal between the interior of the bellows cartridge 32 and the insert adapter conduit 68. With the above described connections between the interior of the pump housing 16 and the rim assembly 58 of the insert adapter 12, and between the threaded socket of the insert adapter 12 and the threaded outlet 80 of the bellows cartridge 32, the insert adapter enables grease to be supplied from the bellows cartridge 32 to the interior grease conduits 50, 52 of the pump housing 16, while preventing grease supplied to the interior conduits from seeping outside the insert adapter and reaching the interior of the grease gun casing 18 and the exterior of the bellows cartridge 32. With the bellows cartridge 32 attached to the insert adapter 12 in the manner described above, the operator next replaces the tube casing 18 on the pump housing 16 by screwing the screw threads 34 of the casing into the internal screw threads 40 of the housing supply opening 36. As the casing is screwed into the head, the first end 20 of the casing abuts against the second annular sealing surface 78 of the adapter, thereby providing an additional seal between the interior conduits 50, 52 of the pump housing 16 and the interior of the tube casing 18 outside the adapter 12. The abutment between the first end 20 of the casing 18 and the second annular sealing surface 78 of the adapter rim assembly presses the first annular sealing surface 74 of the adapter into engagement with the annular sealing surface 44 at the bottom of the pump housing grease supply opening, thereby enhancing the sealing engagement between the first annular sealing surface 74 of the adapter and the annular sealing surface 44 of the pump housing.

In a preferred embodiment, the insert adapter 12 of the invention is constructed entirely of a semi-rigid urethane. However, the adapter could be constructed of other material that gives the adapter the required rigidity to resist the pressure exerted on it by the grease supplied from the tube casing 18 of the gun, while retaining sufficient flexibility to permit the adapter to be inserted into the cylindrical grease supply opening 36 of the gun pump housing 16.

While the present invention has been described by reference to a specific embodiment, it should be understood that modifications and variations of the invention may be constructed without departing from the scope of the invention defined in the following claims.

What is claimed is:

1. An insert means for use with a fluid dispensing device of a type having a pump housing and a fluid supply casing connected to and separable from the pump housing, the pump housing having an interior and an exterior with a fluid supply opening provided on the pump housing exterior, the fluid supply casing having an interior and an exterior with an opening at one end of the fluid supply casing communicating with the fluid supply casing interior and the one end of the fluid supply casing being releasably connected to the pump housing fluid supply opening, the insert means adapting the fluid dispensing device for use with a separate fluid container of a type having an interior containing fluid and an outlet at one end of the fluid container communicating with the fluid container interior, the insert means comprising;
  a support means adapted to be inserted into the pump housing fluid supply opening; and
  a connector means on the support means, the connector means being adapted to be connected to the fluid container outlet and communicate the fluid container interior with the pump contained in the pump housing interior.

2. The insert means of claim 1, wherein:
the support means includes a peripheral ring that is adapted to be engaged in the pump housing fluid supply opening to support the connector means in the fluid supply opening.

3. The insert means of claim 2 wherein:
the peripheral ring has a tapered rim that compresses when the insert means is engaged in the pump housing fluid supply opening and forms a sealing engagement between the insert means and the fluid supply opening.

4. The insert means of claim 2, wherein:
the peripheral ring has an annular sealing surface adapted to engage in sealing engagement with the pump housing fluid supply opening.

5. The insert means of claim 4, wherein:
the peripheral ring has an annular abutment rim on a side of the peripheral ring opposite the annular sealing surface, the annular abutment rim being adapted to engage against the fluid supply casing connected to the pump housing fluid supply opening and press the annular sealing surface into engagement with the pump housing.

6. The insert means of claim 5, wherein:
the annular abutment rim is adapted to sealingly engage against the fluid supply casing.

7. The insert means of claim 1, wherein:
the support means separates the pump housing fluid supply opening from the fluid supply casing interior with the support means inserted into the pump housing fluid supply opening and the fluid supply casing connected to the pump housing fluid supply opening.

8. The insert means of claim 7, wherein:
the connector means includes a conduit that extends from a first side of the support means to a second side of the support means and communicates the pump housing fluid supply opening with the fluid supply casing interior.

9. The insert means of claim 1, wherein:
the connector means includes an annular sealing surface adapted to engage the fluid container outlet in sealing engagement.

10. The insert means of claim 1, wherein:
the insert means is formed of a semi-rigid plastic.

11. The insert means of claim 1, wherein:
the support means is formed as a circular disk with a sealing annular surface extending around the circular disk adapted to sealingly engage in the pump housing fluid supply opening, and the connector means is formed in the sealing annular surface and communicates one side of the circular disk with a second side of the circular disk.

12. An insert means for use with a grease gun of a type having a pump housing and a grease supply casing connected to and separable from the pump housing, the pump housing having an interior and an exterior with a grease supply opening provided on the pump housing exterior, the grease supply casing being of a type that is either packed with grease in bulk or receives an open ended grease cartridge, the grease supply casing having an interior and an exterior with an opening at one end of the grease supply casing communicating with the grease supply casing interior and the one end of the grease supply casing being releasably connected to the pump housing fluid supply opening, the insert means adapting the grease gun for use with a separate container of grease in lieu of packed bulk grease or an open ended grease cartridge, the separate container of grease being of a type having an interior containing grease and an exterior, with an outlet at one end of the grease container communicating with the grease container interior, the insert means comprising:
  a support means adapted to be inserted into and to seat securely in the pump housing grease supply opening; and
  a connector means on the support means, the connector means being adapted to be connected to the grease container outlet and communicate the grease container interior with the pump contained in the pump housing interior.

13. The insert means of claim 12, wherein:
the support means is formed as a disk with a peripheral annular surface that sealingly engages with the pump housing grease supply opening, and the connector means is formed as a socket with an annular surface the sealingly engages with the grease container outlet.

14. The insert means of claim 12, wherein:
the support means is formed as a disk with a tapered rim that extends around a periphery of the disk, the tapered rim is adapted to compress in the pump housing grease supply opening and securely support the support means in the pump housing.

15. The insert means of claim 14, wherein:
the tapered rim securely supports the support means against rotation in the pump housing grease supply opening.

16. The insert means of claim 12, wherein:
the connector means is screw threaded, adapting the connector means to be connected to a screw threaded grease container outlet.

17. The insert means of claim 12, wherein:
the inset means is formed of semi-rigid material.

18. An insert means for use with a grease gun of a type having a pump housing and a grease supply casing connected to and separable from the pump housing, the pump housing having an interior and an exterior with a grease supply opening provided on the pump housing exterior, the grease supply casing being of a type that is either packed with grease in bulk or receives an open ended grease cartridge, the grease supply casing having an interior and an exterior with an opening at one end of the grease supply casing communicating with the grease supply casing interior and the one end of the grease supply casing being releasably connected to the pump housing grease supply opening, the insert means adapting the grease gun for use with a separate container of grease in lieu of packed bulk grease or an open ended grease cartridge, the separate container of grease having an interior containing grease and an exterior, with an outlet at one end of the grease container communicating with the grease container interior, the insert means comprising:
  a sealing means adapted to be inserted into the pump housing grease supply opening and sealingly separate the pump housing grease supply opening from the interior of a grease supply casing connected to the pump housing;

a conduit means extending through the sealing means and communicating the pump housing interior with the grease supply casing interior; and, a connector means on the sealing means adapted to be connected to the grease container outlet and communicate the grease container interior with the pump housing interior.

19. The insert means of claim 18, wherein:
the sealing means includes an annular surface that engages in the pump housing grease supply opening and sealingly separates the pump housing interior from the grease supply casing interior.

20. The insert means of claim 18, wherein:
the connector means includes an annular surface that engages the grease container outlet and sealingly separates the grease container interior from the grease supply casing interior and communicates the grease container interior with the pump housing interior.

* * * * *